(12) United States Patent
Koizumi et al.

(10) Patent No.: US 7,635,421 B2
(45) Date of Patent: Dec. 22, 2009

(54) ELECTROLYTIC APPARATUS FOR USE IN OXIDE ELECTROWINNING METHOD

(75) Inventors: Kenji Koizumi, Naka-gun (JP); Nobuo Okamura, Naka-gun (JP); Tadahiro Washiya, Naka-gun (JP); Shinichi Aose, Naka-gun (JP)

(73) Assignee: Japan Nuclear Cycle Development Institute, Ibaraki (JP)

( * ) Notice: Subject to any disclaimer, the term of this patent is extended or adjusted under 35 U.S.C. 154(b) by 1043 days.

(21) Appl. No.: 10/528,883

(22) PCT Filed: Jul. 23, 2004

(86) PCT No.: PCT/JP2004/010478

§ 371 (c)(1),
(2), (4) Date: Mar. 23, 2005

(87) PCT Pub. No.: WO2005/014888

PCT Pub. Date: Feb. 17, 2005

(65) Prior Publication Data

US 2006/0151326 A1  Jul. 13, 2006

(30) Foreign Application Priority Data

Aug. 6, 2003 (JP) ............................. 2003-206262

(51) Int. Cl.
   *C25C 3/34* (2006.01)
   *C25C 7/02* (2006.01)
   *G21C 19/44* (2006.01)
(52) U.S. Cl. ..................... 205/44; 205/47; 205/362; 204/230.7; 204/243.1; 204/244; 204/246; 204/DIG. 7

(58) Field of Classification Search ............... 205/44, 205/47; 204/244
See application file for complete search history.

(56) References Cited

U.S. PATENT DOCUMENTS

| 4,588,485 A | 5/1986 | Cohen et al. |
| 5,427,657 A | 6/1995 | Sharma |
| 5,650,053 A * | 7/1997 | Gay et al. ................. 204/212 |
| 6,793,894 B2 * | 9/2004 | Hayashi et al. ............. 422/159 |

FOREIGN PATENT DOCUMENTS

| EP | 0 156 744 | 10/1985 |
| JP | 7-316866 | 12/1995 |
| JP | 11-148996 | 6/1999 |
| JP | 2001-141879 | 5/2001 |
| JP | 2002-357696 | 12/2002 |

* cited by examiner

*Primary Examiner*—Patrick Ryan
*Assistant Examiner*—William T Leader
(74) *Attorney, Agent, or Firm*—Wenderoth, Lind & Ponack L.L.P.

(57) ABSTRACT

An electrolytic apparatus for an oxide electrolytic method includes an interior of an electrolytic vessel, a common cathode and two types of anodes different in shape and arrangement, a first electrolysis controller is connected between the cathode and the first anode, and a second electrolysis controller is connected between the cathode and the second anode. The electrolytic processing of the substance in the electrolytic vessel is carried out such that a pair of the cathode and one of the anodes is used for main electrolysis and a pair of the cathode and the other anode is used for auxiliary electrolysis. By this apparatus, prevention of the ununiform distribution of the electrodeposit, improvement of the processing speed and improvement of the durability of the crucible are achieved, whereby the recycling of spent nuclear fuels based on the nonaqueous reprocessing method is made feasible in a commercial scale.

4 Claims, 5 Drawing Sheets

ELECTROLYTIC APPARATUS FOR USE IN OXIDE ELECTROWINNING METHOD

TECHNICAL FIELD

The present invention relates to an electrolytic apparatus for use in an oxide electrowinning method in which apparatus plural types of anodes and at least one common cathode are provided, and the control of the electrodeposit is made to be efficiently carried out by using a pair of one of the anodes with the cathode for main electrolysis and a pair of the one or more remaining anodes with the cathode for auxiliary electrolysis. This technique is useful for the electrolytic system in the oxide electrowinning method, among the nonaqueous reprocessing methods with a molten salt electrolytic technique for spent nuclear fuels.

BACKGROUND ART

Research has been performed on a system to achieve the improvement of the economical efficiency of a whole recycling system in which uranium and plutonium are recovered by utilizing a molten salt electrolytic technique as a reprocessing technique for recycling of spent nuclear fuels used in nuclear reactors. The molten salt electrolytic technique is expected to be high in economical efficiency. (See, for example, Japanese Patent Laid-Open Specification No. 2001-141879.) The relevant electrolytic techniques include an oxide electrowinning method and a metal electrorefining method. When the chemical forms of uranium and plutonium in the electrodeposit are oxides, the oxide electrowinning method is employed.

The oxide electrowinning method is to recover oxides of uranium and plutonium through a simultaneous electrolytic step, a dissolution step by chlorination and a MOX recovery step. In this method, the spent nuclear fuel is first placed in the bottom portion of a crucible doubling as an anode, and then electrolysis is carried out between the anode and a cathode installed in an upper portion of the crucible. By this operation, uranium oxide contained in a large amount in the spent nuclear fuel is dissolved into the molten salt due to anodic oxidation, and simultaneously recovered by depositing uranium oxide on the surface of the cathode due to cathodic reduction (a simultaneous electrolytic step). Thereafter, the electrolytic operation is stopped, and uranium oxide, plutonium oxide and other elements remaining in the spent nuclear fuel are dissolved into the molten salt by blowing chlorine gas into the molten salt to convert them to chlorides thereof (a dissolution step by chlorination). After the whole spent nuclear fuel has been dissolved into the molten salt, electrolysis is carried out between the anode doubling as the crucible and the cathode installed in the upper portion of the crucible, and the oxides of uranium and plutonium are recovered by depositing the oxides in a mixed state on the surface of the cathode (a MOX recovery step).

The reactions involved in the respective steps are shown below:

a simultaneous electrolytic step:

$UO_2 \rightarrow UO_2^{2+}$ (anodic reaction)

$UO_2^{2+} \rightarrow UO_2$ (cathodic reaction)

a dissolution step by chlorination:

$UO_2 + Cl_2 \rightarrow UO_2Cl_2$ $PuO_2 + C + 2Cl_2 \rightarrow PuCl_4 + CO_2$ a MOX recovery step:

$UO_2Cl_2 \rightarrow UO_2 + Cl_2$ (cathodic reaction)

$PuCl_4 + O_2 \rightarrow PuO_2 + 2Cl_2$ (cathodic reaction)

As described above, in the conventional technique, a constitution is adopted such that the crucible containing the substance to be treated doubles as the anode, the cathode is installed in the molten salt, and electrolysis is carried out between the anode (the crucible) and the cathode. Alternatively, there is another constitution such that the anode and cathode are installed in the crucible and electrolysis is carried out therebetween.

However, such a conventional technique as described above has suffered from the following problems to be solved. When the crucible doubles as the anode, in the steps other than the simultaneous electrolytic step, the distance between the anode and the cathode is uniformly maintained to be uniform and hence the current density is uniform, so that the ununiform distribution of the electrodeposit hardly takes place; on the contrary, in the simultaneous electrolytic step, the spent nuclear fuel placed in the bottom of the crucible functions as the anode, so that the distance between the electrodes is not maintained constant. Consequently, the current density distribution on the surface of the cathode becomes ununiform, resulting in the ununiform distribution of the electrodeposit. Further, the distance between the lower end of the cathode and the surface of the spent nuclear fuel becomes shorter, the current density around the lower end of the cathode is thereby increased and accordingly the electrodeposit is concentrated around the lower end of the cathode, so that when stirring is not sufficiently conducted, the ions in the bulk region become insufficient and the processing speed is degraded.

Additionally, because the environment involved is highly corrosive owing to the use of chlorine gas, a material prepared by coating (with vapor deposition) graphite blank with pyrographite excellent in corrosion resistance is used as the material for the crucible doubling as the anode. However, because of the operation condition, such as high temperature molten salt and chlorine gas conditions, the operation life time of the crucible is in the order of 1,000 hours. Consequently, the crucible needs to be replaced at frequent intervals, leading to the decreasing of the processing speed.

Furthermore, it is conceivable that the electrolytic apparatus can be made larger in size as a measure for improving the processing speed. However, it is difficult to make a crucible made of pyrographite larger in size from the viewpoint of product fabrication.

Even when the constitution is such that the anode and cathode are installed in the crucible, the distance between the electrodes are not uniform, and hence the current density distribution on the cathode surface becomes ununiform, and the ununiform distribution of the electrodeposit takes place.

The bonding force between uranium oxide and plutonium oxide deposited as the forms of oxides and the surface of the electrodes are lower than the bonding force for the metallic state as in plating and the like. Consequently, in the conventional technique, in any case where the electrodeposit is concentrated in a particular portion, the possibility that the electrodeposit falls down from the surface of the cathodes during the electrolytic operation becomes high owing to the stirring effect of the various process gases blown into the molten salt.

Additionally, in view of the prevention of the criticality, it can hardly be an appropriate countermeasure to simply make the electrolytic apparatus larger in size.

SUMMARY OF THE INVENTION

An object of the present invention is to provide an electrolytic apparatus for use in an oxide electrowinning method which apparatus can prevent the ununiform distribution of the electrodeposit.

Another object of the present invention is to provide an electrolytic apparatus which can achieve the improvement of the processing speed and the improvement of the durability of the crucible, and can carry out the recycling of spent nuclear fuels in a commercial scale on the basis of the nonaqueous reprocessing method.

According to the present invention, there is provided an electrolytic apparatus for use in an oxide electrowinning method, the apparatus comprising a plurality of anodes different from each other in shape and arrangement and at least one common cathode installed in an electrolytic vessel, wherein a pair of one of the anodes and the cathode is used for main electrolysis and a pair of the one or more remaining anodes and the cathode is used for auxiliary electrolysis.

Additionally, there is provided an electrolytic apparatus for use in an oxide electrowinning method, the apparatus comprising an annular electrolytic vessel made of a metallic material and designed in consideration of criticality control with geometrical control, a high frequency induction coil for heating a substance to be processed in said electrolytic vessel, an annular anode installed at the bottom of an annular space formed in the annular electrolytic vessel, and rod-shaped anodes and rod-shaped cathodes installed along the axial direction in the annular space, wherein a parallel pair of the rod-shaped anodes and the rod-shaped cathodes arranged in parallel or a vertical pair of the annular anode and the rod-shaped cathodes arranged vertically is used for main electrolysis and the other of the pairs is used for auxiliary electrolysis.

A typical example of the parallel pair of electrodes is a constitution of alternately arranged electrodes in which the anodes and cathodes are alternately arranged. As for these arrangements, a constitution is preferable wherein the rod-shaped cathodes are supported rotatably and a rotation driving mechanism is additionally installed, and the cathodes are continuously rotated during electrolytic operation.

Additionally, the present invention is a spent nuclear fuel reprocessing method with an oxide electrowinning method by using such an electrolytic apparatus as described above, wherein the substance to be processed in the annular electrolytic vessel is a molten salt dissolving the spent nuclear fuel, and wherein in a simultaneous electrolytic step in which uranium oxide contained in the spent nuclear fuel is dissolved into the molten salt by anodic oxidation reaction and simultaneously recovered as uranium oxide electrodeposition on the surface of the cathode by cathodic reduction reaction, the vertical pair of the electrodes is used for main electrolysis in which uranium oxide is dissolved and deposited by electrochemical reaction, and the parallel pair of the electrodes is used for auxiliary electrolysis whose role is to suppress the ununiform uranium oxide electrodeposition; and in a MOX recovery step in which the oxides of uranium and plutonium are deposited and recovered in a mixed state, the parallel pair of the electrodes is used for main electrolysis in which MOX is deposited, and the vertical pair of the electrodes is used for auxiliary electrolysis whose role is to dissolve the electrodeposit fallen down from the cathodes.

DETAILED DESCRIPTION OF THE INVENTION

Figure 1:
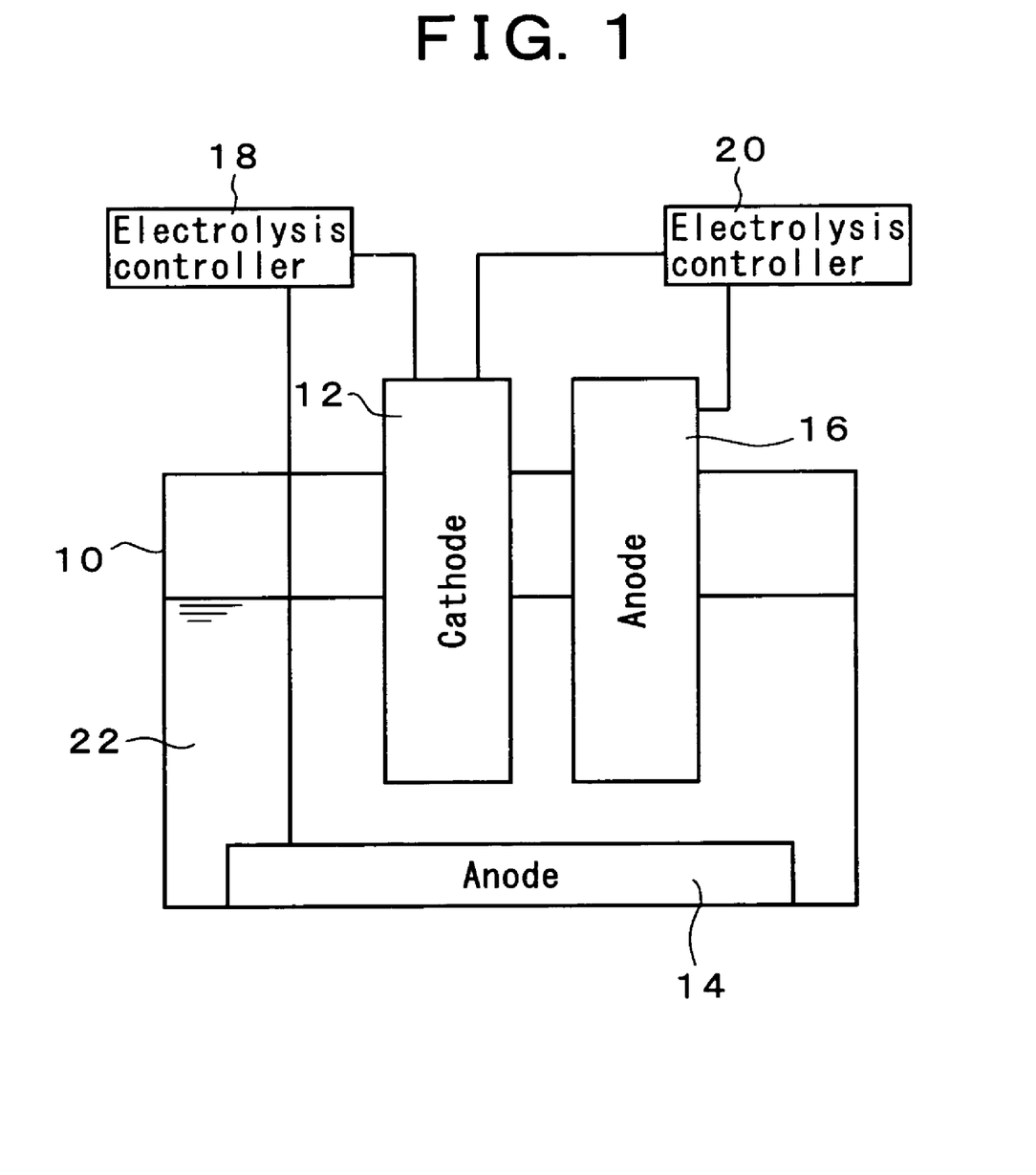
FIG. 1 A conceptual diagram illustrating an electrolytic apparatus for use in an oxide electrowinning method according to the present invention.

A conceptual diagram illustrating an electrolytic apparatus for an oxide electrowinning method according to the present invention is shown in FIG. 1. The constitution of the electrolytic apparatus is such that in the interior of an electrolytic vessel 10, a common cathode 12 and two types of anodes different in shape and arrangement (here, a first anode 14 arranged beneath the cathode 12, and a second anode 16 arranged side by side with the cathode 12) are arranged, a first electrolysis controller 18 is connected between the cathode 12 and the first anode 14, and a second electrolysis controller 20 is connected between the cathode 12 and the second anode 16. The cathode, the first anode and the second anode may be composed of one or more members, respectively. The pair of the cathode and one of the anodes is used for the main electrolysis, and the pair of the cathode and the other of the anodes is used for the auxiliary electrolysis, and thus the substance 22 to be processed in the electrolytic vessel is subjected to electrolytic processing. Either the main electrolysis or the auxiliary electrolysis can be properly applied depending on the electrolytic steps.

For example, in a simultaneous electrolytic step, the vertically arranged electrodes (the vertical pair of the cathode 12 and the first anode 14) are used for the main electrolysis, and the parallel arranged electrodes (the parallel pair of the cathode 12 and the second anode 16) are used for the auxiliary electrolysis. In a MOX recovery step, on the contrary, the parallel arranged electrodes are used for the main electrolysis and the vertically arranged electrodes are used for the auxiliary electrolysis.

EXAMPLES

Figure 2A:
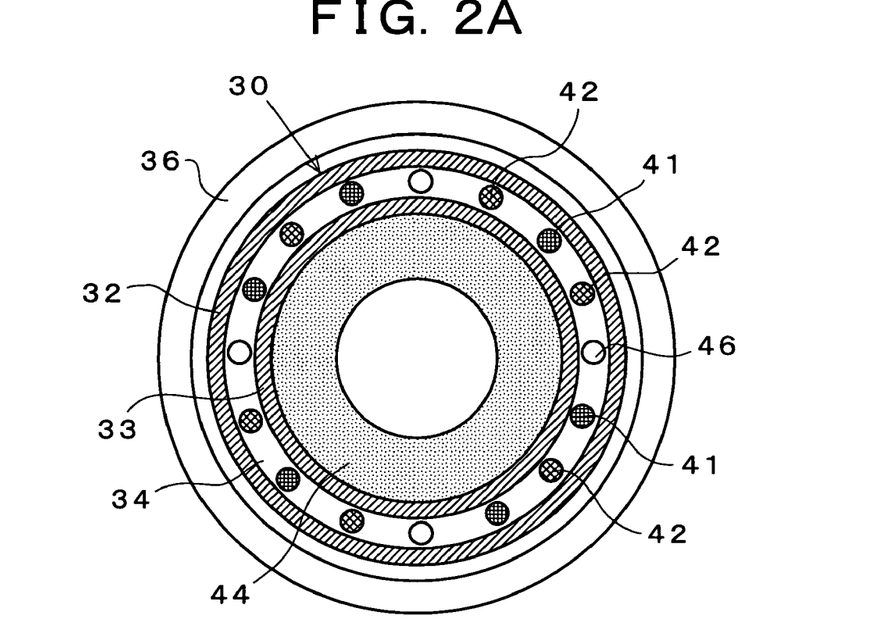
FIG. 2A transverse sectional view illustrating an example of an electrolytic apparatus for an oxide electrowinning method according to the present invention.
Figure 2B:
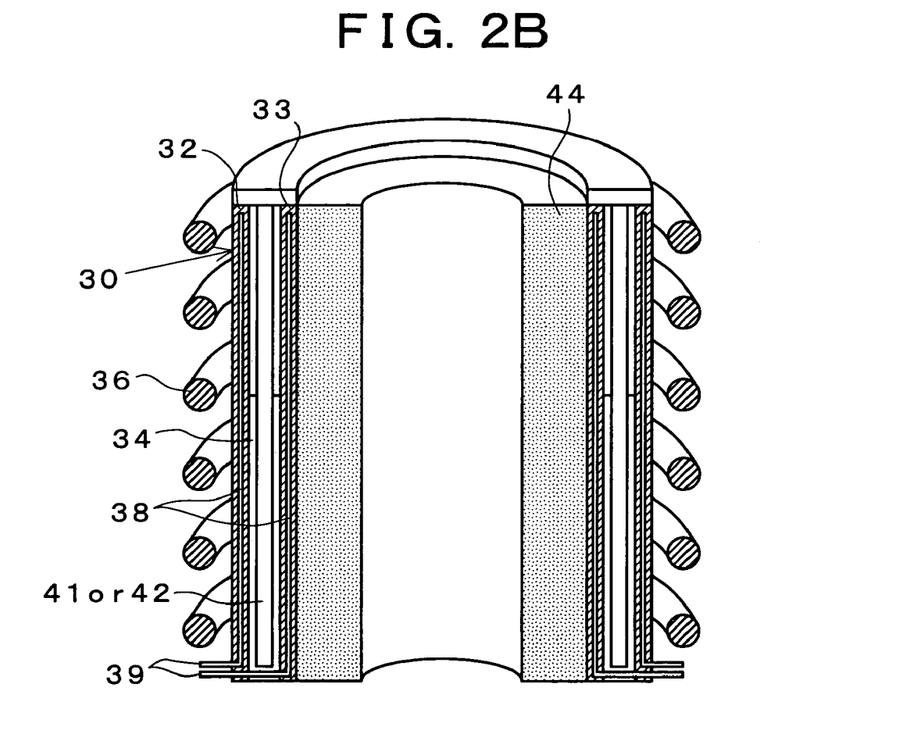
FIG. 2B A longitudinal sectional view illustrating an example of an electrolytic apparatus for an oxide electrowinning method according to the present invention.
Figure 3:
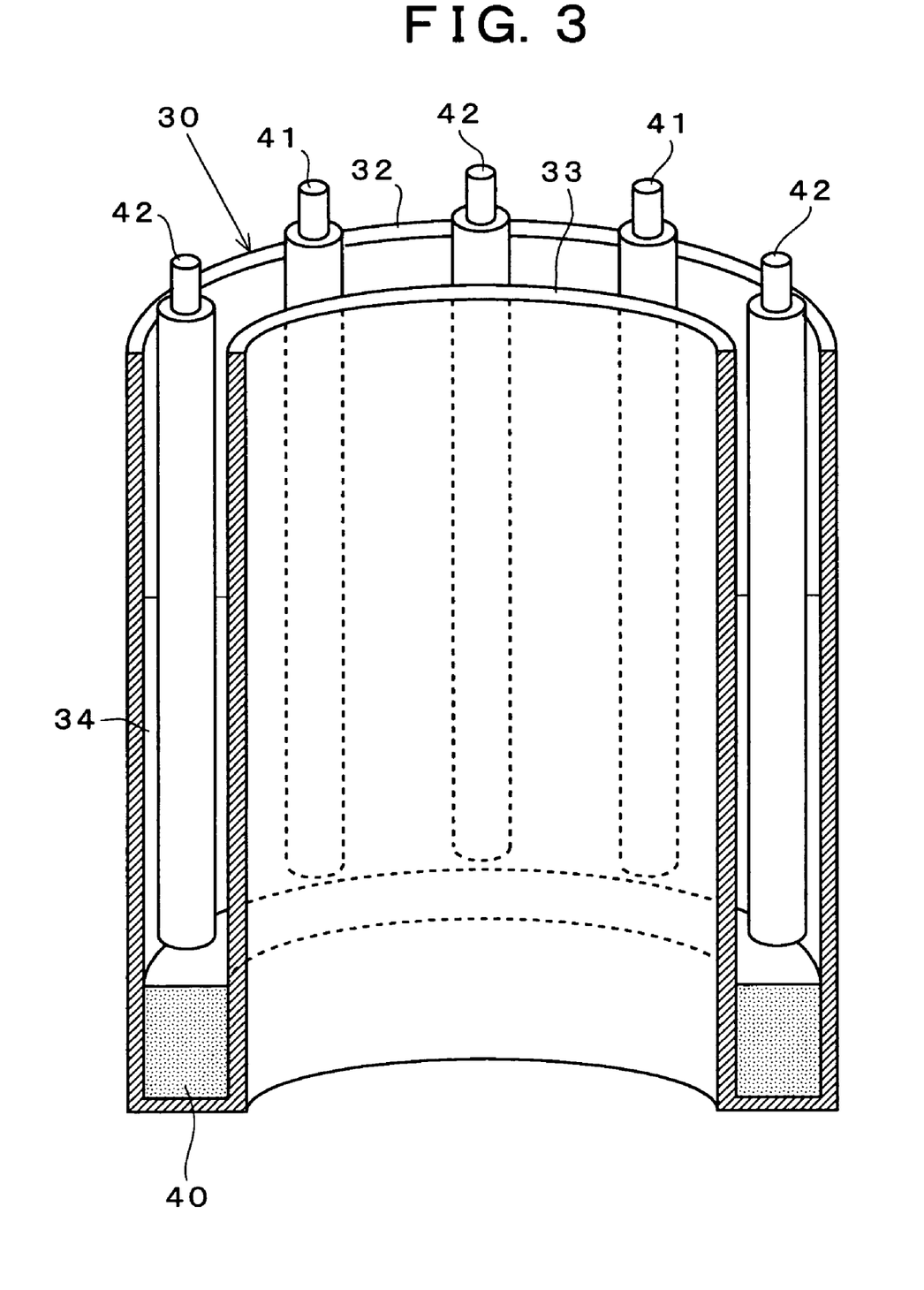
FIG. 3 An explanatory diagram illustrating the arrangement of electrodes in the apparatus shown in FIG. 2.

FIGS. 2A and 2B are sectional views illustrating an example of the electrolytic apparatus for the oxide electrowinning method according to the present invention, in which FIG. 2A is a transverse sectional view and FIG. 2B is a longitudinal sectional view. FIG. 3 is an explanatory diagram illustrating the electrode arrangement in the apparatus shown in FIGS. 2A and 2B. This is an electrolytic apparatus for use in an oxide electrowinning method for recovering uranium and plutonium on the basis of the nonaqueous reprocessing of spent nuclear fuels utilizing a molten salt electrolytic technique.

In this example, an annular electrolytic vessel is adopted in consideration of criticality control with geometrical control. The annular electrolytic vessel 30 comprises an outer crucible 32 and an inner crucible 33 which are concentrically installed, and a substance 34 to be processed (a molten salt dissolving spent nuclear fuels) is placed in an annular space formed by these crucibles. A high frequency induction coil 36 for heating the substance to be processed is installed outside the annular electrolytic vessel 30. The configuration of each of the outer crucible 32 and the inner crucible 33 is such that a coolant channel 38 is provided in the interior thereof, and the coolant is made to circulate through a coolant port opening 39, and thus the outer and inner crucibles are compulsorily cooled.

As a result of the criticality calculation, the thickness of the annular space, in which the substance to be processed is placed, estimated from the viewpoint of safety is approximately 16 cm. The depth of the molten salt is needed to be 1 m or more for the purpose of affording the processing ability of the order of 50 tHM/y per apparatus. Accordingly, in the evaluation of the feasibility of the electrolytic apparatus concerned, the investigation of the optimal electrode shapes and arrangement is an important problem.

In this electrolytic apparatus, it is necessary to exactly maintain the crucible dimension so as to prevent the criticality, and hence the corrosion resistance equal to or higher than the corrosion resistance of the crucible made of pyrographite is required. Accordingly, the corrosion resistance of the crucible material is improved by adopting such a cold crucible type high frequency induction heating method as described above, and a metallic material excellent in fabricability is adopted for the crucible material for the purpose of improving the processing speed through making the apparatus larger in size. For example, the most suitable metallic material is Hastelloy-C (trade name) which is a nickel based superalloy.

In this example, an annular anode 40 is installed at the bottom of the annular space, and rod-shaped anodes 41 and rod-shaped cathodes 42 are alternately inserted from the upper portion and arranged in the annular space. The electrode pairs of the rod-shaped anodes 41 and the rod-shaped cathodes 42 (referred to as "alternately arranged electrodes") and the electrode pairs of the annular anode 40 and the rod-shaped cathodes 42 (referred to as "vertically arranged electrodes") are formed, respectively, and one of these electrode pairs is used for the main electrolysis and the other of these electrode pairs is used for the auxiliary electrolysis. For the annular anode 40, rod-shaped anodes 41 and rod-shaped cathodes 42, a material prepared, for example, by coating (with vapor deposition) the surface of graphite with pyrographite is most suitable, from the viewpoint of the corrosion resistance. For the sake of easy understanding of the figure, the annular anode is omitted in FIGS. 2A and 2B, and the coolant channels in the crucible are omitted in FIG. 3.

A cylindrical neutron absorber (for example, $B_4C$) 44 is installed inside the inner crucible 33. In the annular space, gas pipes 46 are longitudinally inserted and installed in parallel with the rod-shape electrodes. The substance to be processed is a molten salt dissolving spent nuclear fuels, and as the molten salt, for example, a mixture in a molar ratio of 1:2 of sodium chloride (NaCl) and cesium chloride (CsCl) is used.

In the simultaneous electrolytic step, the vertically arranged electrodes are used for the main electrolysis, and the alternately arranged electrodes are used for the auxiliary electrode. In this way, uranium oxide in the fuel is efficiently subjected to anodic dissolution into the molten salt by means of the vertically arranged electrodes, and simultaneously the current density concentration in the ends of the cathodes is suppressed by means of the alternately arranged electrodes to thereby deposit uranium oxide ions dissolved in the molten salt all over the surface of the cathodes.

In the MOX recovery step (a step of recovering uranium oxide and a step of recovering oxides of uranium and plutonium), on the contrary, the alternately arranged electrodes are used for the main electrolysis and the vertically arranged electrodes are used for the auxiliary electrolysis. In this way, by means of the alternately arranged electrodes, uranium oxide ions and plutonium oxide ions dissolved in the molten salt can be deposited uniformly on the surface of the cathodes. Additionally, when the electrodeposit falls down from the surface of the cathodes owing to the stirring effect due to the process gas and the like, the fallen-down uranium oxide can be subjected to anodic dissolution by means of the vertically arranged electrodes, and the fallen-down plutonium oxide can be dissolved by chlorination with the aid of the chlorine gas generated by the anodic reaction.

In the above described example, the rod-shaped cathodes and the rod-shaped anodes are alternately arranged. However, there may be employed a constitution wherein a unit is formed in such a way that two rod-shaped anodes are arranged on both sides of a rod-shaped cathode, and a plurality of such units are arranged.

In the above described example, the rod-shaped cathodes are not being rotated, but a constitution with added rotation driving mechanism is also effective. When the rotating function is added to the cathodes, there can be obtained an effect such that the ununiformity of the current density distribution on the surface of the electrodes is suppressed and accordingly the ununiform distribution of the electrodeposit is prevented. Additionally, the rotating function leads to stirring of the molten salt, and thus there can be expected an effect such that the ununiformity of the element concentration distribution in the molten salt which is considered as a possible factor causing the ununiform distribution of the electrodeposit, is suppressed.

Figure 4:
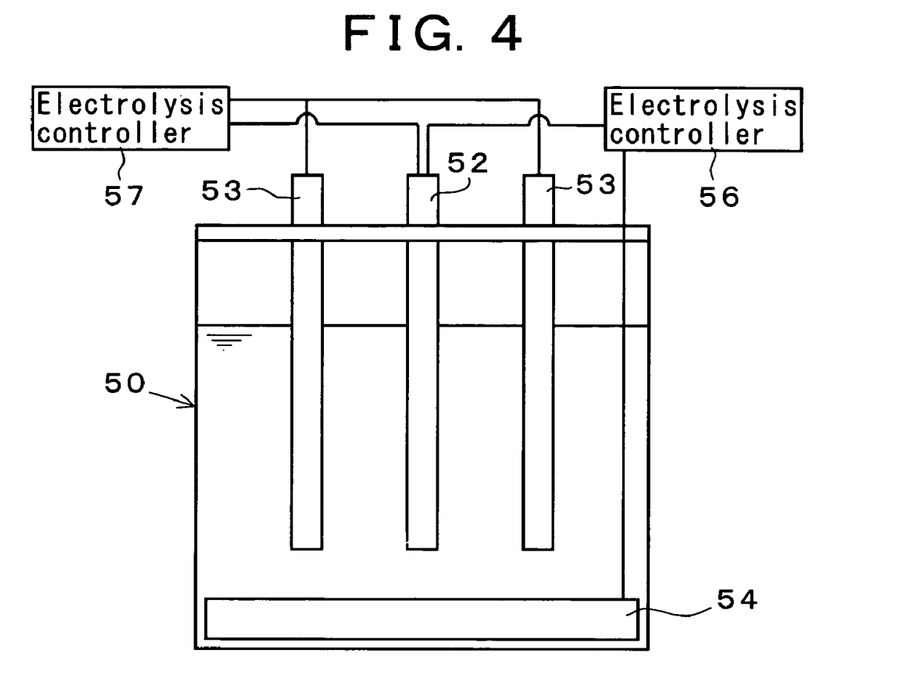
FIG. 4 A diagram illustrating the outline of a test apparatus for confirming the prevention of the ununiform distribution of the electrodeposit based on a particular arrangement of the electrodes.
Figure 5:
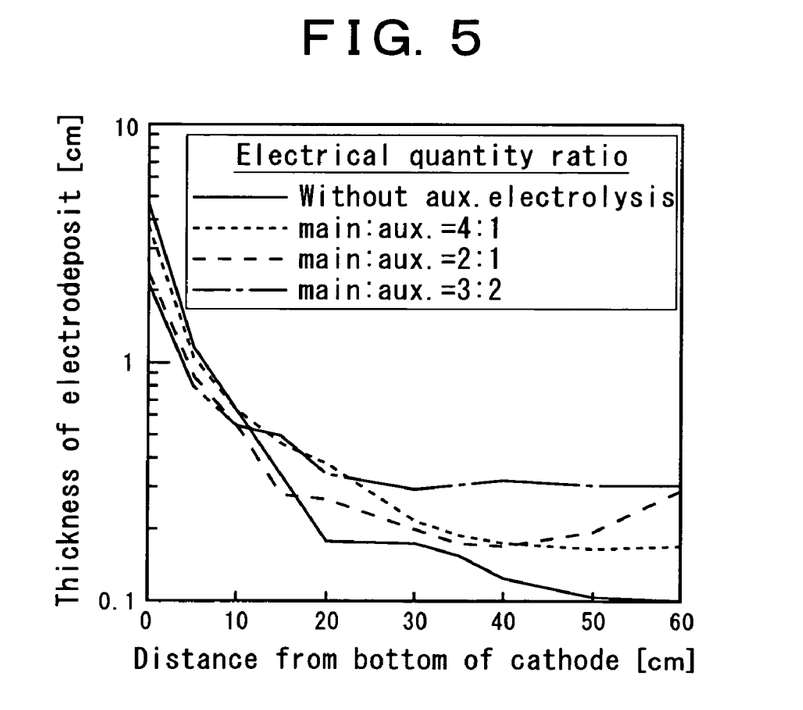
FIG. 5 A graph showing an example of test results for confirming the prevention of the ununiform distribution by using the apparatus shown in FIG. 4.

Now, description will be made on the results of an electrolytic test carried out by using two sets of electrode pairs different from each other in shape and arrangement. The outline of the test apparatus is shown in FIG. 4, the test conditions are shown in Table 1, and the test results are shown in FIG. 5.

The test apparatus employed has a constitution such that a common cylindrical cathode 52 and two cylindrical anodes 53 situated respectively on both sides of the common cathode are inserted from the upper portion and installed in the interior of a box-shaped electrolytic vessel 50; a rectangular parallelepiped anode 54 is arranged at the bottom of the electrolytic vessel 50; and an electrolysis controller 56 for the main electrolysis is connected between the cylindrical cathode 52 and the rectangular parallelepiped anode 54, and an electrolysis controller 57 for the auxiliary electrolysis is connected between the cylindrical cathode 52 and the two cylindrical anodes 53. This constitution corresponds to a simulation of the annular electrolytic apparatus obtained by simplifying in such a way that parts of the alternately arranged electrodes installed annularly and the vertically arranged electrodes are cut off and the overall shape of the electrodes is extended from a curved shape into a box shape from the operational viewpoint.

TABLE 1

| Electrolyte | Copper sulfate solution |
| --- | --- |
| Electrolyte composition | Copper conc.: 50 g/L |
| | Sulfuric acid conc.: 150 g/L |
| Electrolysis time | 2 to 4 hr |
| Cathode current density | 300 A/m$^2$ |
| Cathode immersion depth | 65 cm |
| Cathode rotation | Not applied |
| Distance between cathode and anode for main electrolysis | 11 cm |
| Distance between cathode and anodes for auxiliary electrolysis | 3 cm |

For the convenience of the test, a copper sulfate solution was employed as the electrolyte. A test was carried out with as a parameter the ratio between the main electrolysis and the auxiliary electrolysis (the ratio of electricity quantity), and as shown in FIG. 5, the effect of preventing the ununiform distribution of the electrodeposit due to the auxiliary electrolysis was able to be confirmed. Under the conditions such that no auxiliary electrolysis is applied, the electrodeposit is concentrated around the bottom portion of the cathode, namely, around the portion close to the rectangular parallelepiped anode. However, the auxiliary electrolysis is additionally applied by providing the alternately arranged cylindrical anodes, the thickness of the electrodeposit around the bottom portion of the cathode becomes thinner, and simultaneously the thickness of the electrodeposit in the upper portion of the cathode is increased. This is because the addition of the auxiliary electrolysis alleviates the concentration of the electrodeposit around the bottom portion of the cathode. In a test of the copper electrodeposition in which this test apparatus was used and a copper sulfate solution was utilized, when the electricity quantity ratio of the main electrolysis to the auxiliary electrolysis was set to be 3:2, there was obtained a result such that the ununiformity in the electrodeposit distribution with respect to the distance from the bottom of the cathode was able to be suppressed most satisfactorily.

Figure 6:
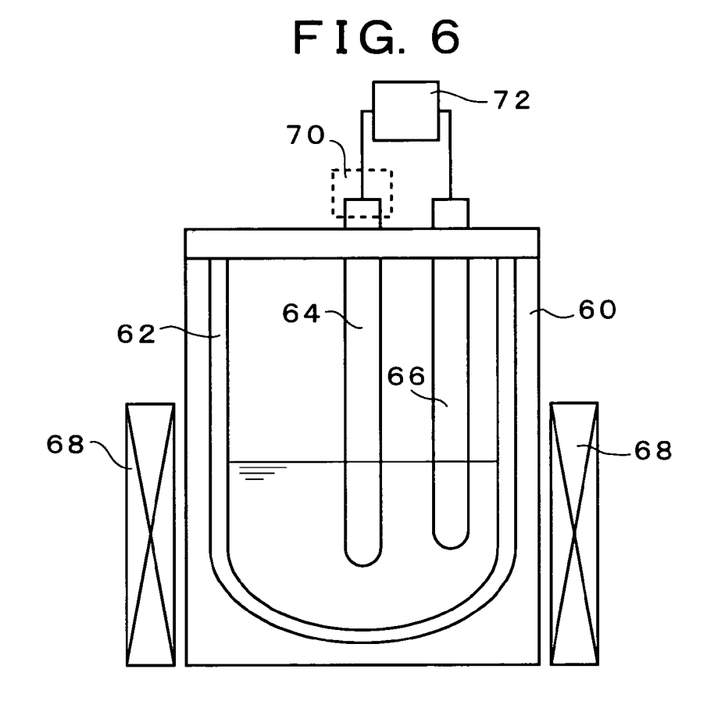
FIG. 6 A diagram illustrating the outline of a test apparatus for confirming the prevention of the ununiform distribution of the electrodeposit based on the rotation of the cathode.
Figure 7:
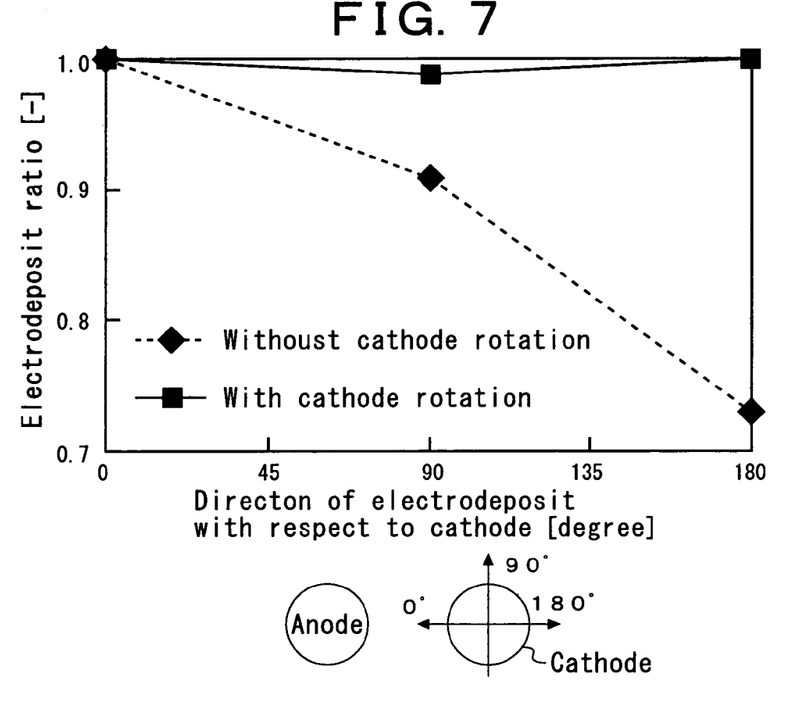
FIG. 7 A graph showing an example of test results for confirming the prevention of the ununiform distribution of the electrodeposit by using the apparatus shown in FIG. 6.

Now, description will be made below on the test results of the effect of preventing the ununiform distribution of the electrodeposit due to the rotation of the cathode. The outline of the test apparatus is shown in FIG. 6, the test conditions are shown in Table 2, and the test results are shown in FIG. 7. The test apparatus has a structure such that a cylindrical cathode 64 and a cylindrical anode 66 are inserted and installed in a crucible 62 housed in a protection vessel 60, and the molten salt in the crucible 62 is heated with a resistance heater 68. A rotation driving device 70 is attached to the cylindrical cathode 64, and rotating function is applied to the cathode. An electrolysis controller 72 was connected between the cylindrical cathode 64 and the cylindrical anode 66, and the electrolysis of the molten salt was carried out.

TABLE 2

| Electrolyte | Molten salt |
| --- | --- |
| Electrolyte composition | Base salts: NaCl-2CsCl, 10 kg |
| | Deposition substance: AgCl, 140 g/L |
| Electrolysis time | 1 hr |
| Cathode current density | 400 A/m$^2$ |
| Cathode immersion depth | 7 cm |
| Anode immersion depth | 5 cm |
| Distance between cathode and anode | 7 cm |
| Cathode rotation | Applied at 60 rpm or not applied |

In this test apparatus, the cathode 64 and the anode 66 are arranged side by side, and hence the distance between the cathode and the anode varies depending on the particular portions on the surfaces thereof; thus, the current density on the cathode surface tends to be concentrated on the side of the cathode facing to the anode. Under the condition such that the cathode is not being rotated, the current density on the side of the cathode facing to the anode is increased, and accordingly the electrodeposit is concentrated and deposited thicker on the side of the cathode facing to the anode. On the contrary, when the cathode is being rotated, the instantaneous distances between the respective portions of the cathode surface and the anode are different, but an apparent average distance therebetween is identical for any portion of the cathode surface. Accordingly, the current density on the cathode surface becomes uniform, and the thickness of the electrodeposit is thereby made uniform. As can be seen from FIG. 7, the effect of preventing the ununiform distribution of the electrodeposit due to the rotation of the cathode has been confirmed. Incidentally, in the case "with cathode rotation" in FIG. 7, the cathode is rotated at 60 rpm during electrolytic operation.

As described above, the present invention is an electrolytic apparatus for an oxide electrowinning method in which apparatus a plurality of anodes different from each other in shape and arrangement and at least one common cathode are installed in an electrolytic vessel, a pair of one of the anodes and the cathode is used for main electrolysis, and a pair of the one or more remaining anodes and the cathode is used for auxiliary electrolysis; thus, the present invention can suppress the ununiform distribution of the electrodeposit on the bottom portion of the cathode, which is concerned about in a commercial-scale electrolytic apparatus with large electrodes.

Additionally, the adoption of the criticality control method with the geometrical control and the adoption of a cold crucible type high frequency induction heating method make it possible to use a crucible made of metal. Accordingly, it becomes possible to make the electrolytic apparatus larger in scale, the electrolytic processing can be based on either a batch method or a continuous method, and therefore, the processing speed is drastically improved. Additionally, in the criticality control method with the geometrical control, the quantities of the nuclear substances need not be determined at every step, and hence the operation time of the electrolytic apparatus can be reduced.

Furthermore, the adoption of the cathode with rotating function uniformizes the apparent distance between the cathodes and the anodes in the constitution of the "parallel arranged electrodes", and hence it becomes possible to uniformize the thickness of the electrodeposit to an extreme extent. Additionally, in the constitution of the "vertically arranged electrodes", the substance to be processed is stirred by the rotation of the cathodes, and hence there is expected an effect of suppressing the ununiformity in the distribution of concentration in the substance to be processed, so that the effect of preventing the ununiform distribution of the electrodeposit is actualized in contrast to the nonrotating condition.

Additionally, when the electrodeposit falls down from the cathode, it is dissolved by oxidation reaction on the anode arranged in the lower location composing the "vertically arranged electrodes" and by chlorination due to the chlorine gas generated on the anode, whereby the fallen-down electrodeposit can be efficiently dissolved and the sedimentation of the electrodeposit can be prevented.

The invention claimed is:

1. An electrolytic apparatus for use in an oxide electrowinning method, said apparatus comprising:
    an annular electrolytic vessel made of a metallic material and having an annular space with a bottom formed therein and an upper portion;
    a high frequency induction coil for heating a substance to be processed in said electrolytic vessel;
    an annular anode installed at the bottom of the annular space formed in the annular electrolytic vessel;
    rod-shaped anodes and rod-shaped cathodes installed in the upper portion along the axial direction in the annular space and arranged in parallel, the rod-shaped anodes and the annular anode being arranged vertically;
    a first electrolysis controller connected between the rod-shaped cathodes and the annular anode, and
    a second electrolysis controller connected between the rod-shaped cathodes and the rod-shaped anodes,
    wherein one of a parallel pair of the rod-shaped anodes and the rod-shaped cathodes arranged in parallel or and a vertical pair of the annular anode and the rod-shaped cathodes arranged vertically is used for main electrolysis and the other of the pairs is used for auxiliary electrolysis.

2. An electrolytic apparatus for use in an oxide electrowinning method according to claim 1, further comprising a rotational driving mechanism, wherein the rod-shaped cathodes are supported rotationally and are rotated by the rotational driving mechanism.

3. A spent nuclear fuel reprocessing method with an oxide electrowinning method by using the electrolytic apparatus according to claim 1, wherein the oxide electrowinning method comprises:
    a simultaneous electrolytic step, including dissolving uranium oxide contained in spent nuclear fuel into a molten salt in the annular electrolytic vessel due to an anodic oxidation reaction, and simultaneously recovering uranium oxide by depositing uranium oxide on the surface of the cathodes due to cathodic reduction;
    a dissolution step by chlorination in which the electrolytic step is stopped, including dissolving uranium oxide, plutonium oxide and other elements remaining in the spent nuclear fuel into the molten salt by blowing chlorine gas into the molten salt to convert the uranium oxide, the plutonium oxide and other elements remaining in the spent nuclear fuel to chlorides thereof; and
    a MOX recovery step, including performing electrolysis between the anodes and the rod-shaped cathodes installed in the upper portion of the annular space, and recovering oxides of uranium and plutonium by deposition of the oxides in a mixed state on the surface of the cathodes, after the entire spent nuclear fuel has been dissolved into the molten salt;
    wherein in the simultaneous electrolytic step, the vertical pair of the annular anode and the rod-shaped cathodes is used for main electrolysis in which uranium oxide is dissolved and deposited by electrochemical reaction and the parallel pair of the rod-shaped anodes and the rod-shaped cathodes is used for auxiliary electrolysis for suppressing ununiform uranium oxide electrodeposition, and
    wherein in the MOX recovery step, the parallel pair of the rod-shaped anodes and the rod-shaped cathodes is used for main electrolysis in which the MOX is deposited, and the vertical pair of the annular anode and the rod-shaped cathodes is used for auxiliary electrolysis for dissolving any electrodeposit which has fallen down from the cathodes.

4. A spent nuclear fuel reprocessing method with an oxide electrowinning method by using the electrolytic apparatus according to claim 2, wherein the oxide electrowinning method comprises:
    a simultaneous electrolytic step, including dissolving uranium oxide contained in spent nuclear fuel into a molten salt in the annular electrolytic vessel due to an anodic oxidation reaction, and simultaneously recovering uranium oxide by depositing uranium oxide on the surface of the cathodes due to cathodic reduction;
    a dissolution step by chlorination in which the electrolytic step is stopped, including dissolving uranium oxide, plutonium oxide and other elements remaining in the spent nuclear fuel into the molten salt by blowing chlorine gas into the molten salt to convert the uranium oxide, the plutonium oxide and other elements remaining in the spent nuclear fuel to chlorides thereof; and
    a MOX recovery step, including performing electrolysis between the anodes and the rod-shaped cathodes installed in the upper portion of the annular space, and recovering oxides of uranium and plutonium by deposition of the oxides in a mixed state on the surface of the cathodes, after the entire spent nuclear fuel has been dissolved into the molten salt;
    wherein in the simultaneous electrolytic step, the vertical pair of the annular anode and the rod-shaped cathodes is used for main electrolysis in which uranium oxide is dissolved and deposited by electrochemical reaction and the parallel pair of the rod-shaped anodes and the rod-shaped cathodes is used for auxiliary electrolysis for suppressing ununiform uranium oxide electrodeposition, and
    wherein in the MOX recovery step, the parallel pair of the rod-shaped anodes and the rod-shaped cathodes is used for main electrolysis in which the MOX is deposited, and the vertical pair of the annular anode and the rod-shaped cathodes is used for auxiliary electrolysis for dissolving any electrodeposit which has fallen down from the cathodes.

* * * * *